Patented Apr. 18, 1939

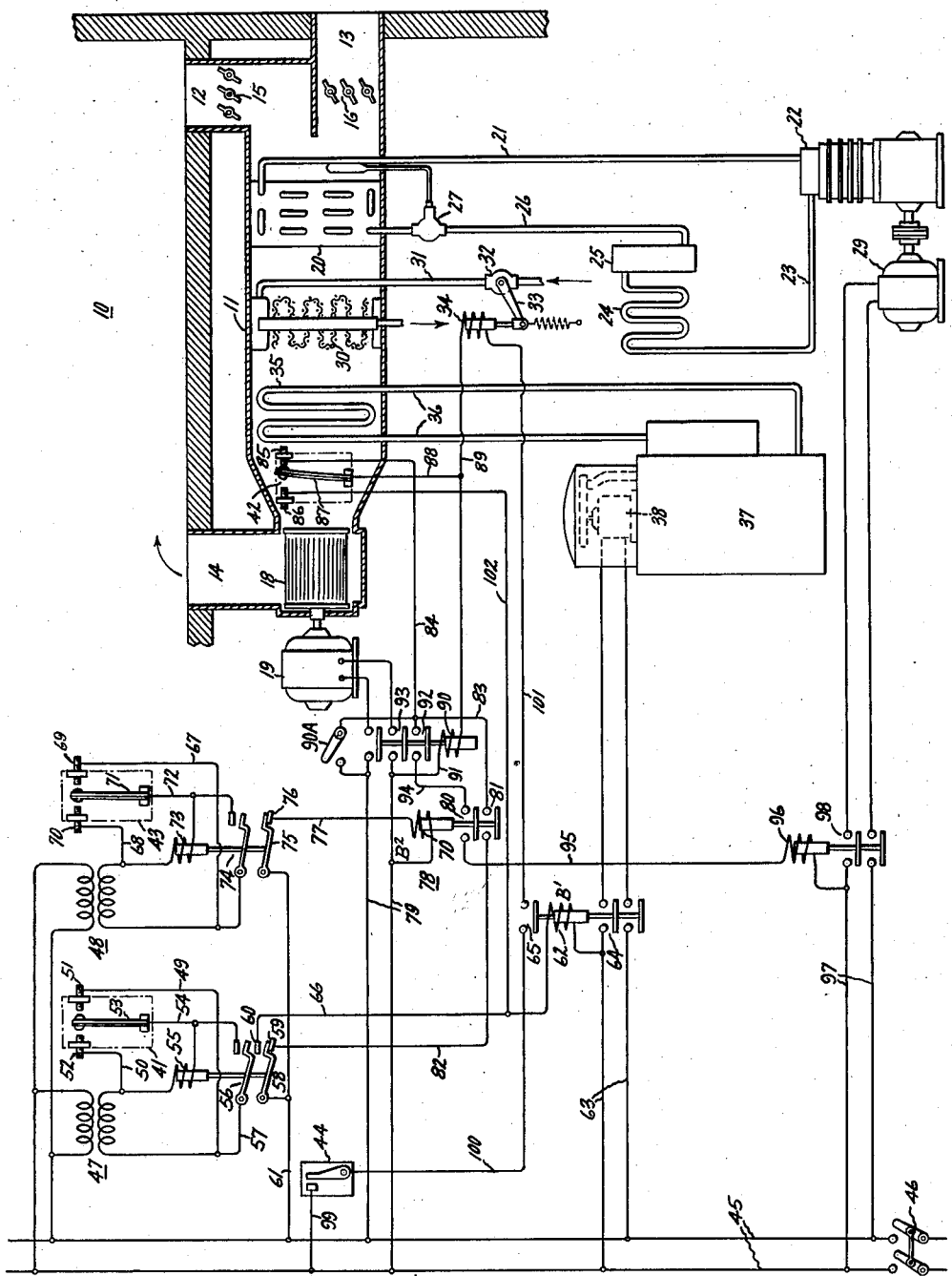

2,155,256

UNITED STATES PATENT OFFICE 2,155,256

TEMPERATURE REGULATING SYSTEM

Harry R. Crago, Caldwell, N. J., assignor to General Electric Company, a corporation of New York Application September 10, 1936, Serial No. 100,119

13 Claims. (Cl. 257—3)

My invention relates to temperature regulating systems and more particularly to systems of the type in which the temperature changing means are controlled by independent thermal responsive means.

Dual thermostat control of heating and cooling means to maintain the temperature of an enclosed space within predetermined limits the year around has been used for reasons of economy, simplicity of the control and to insure dependable operation. Controls of this nature function properly when the thermal responsive means are non-adjustable or are adjusted to operate at different temperatures, as they are under normal operating conditions. However, adjustable thermal responsive means are desirable, if not necessary, in most installations and their use creates a possibility that they may be adjusted to function at the same temperature and thereby simultaneously place in operation both heating and cooling means.

It is an object of my invention to provide a new and improved dual thermostat control system in which simultaneous operation of both temperature changing means is prevented.

More particularly it is an object of my invention to provide a control system in which the thermal responsive means controlling the heating means takes precedence when both thermal responsive means are adjusted to operate at the same temperature or in the same temperature range.

Another object of my invention is to so correlate the dual thermostat control with the means for circulating the heat exchange medium through the space that the circulating means is rendered operative only when the temperature of the medium reaches a predetermined value upon a call for heat and immediately upon a call for cooling.

This last mentioned aspect of my present invention is an improvement over the invention disclosed in my copending application, Serial No. 83,921, filed June 6, 1936. In this application is disclosed an arrangement in which a single thermal responsive means located in the space controls either the heating or cooling means, depending on which of these has been selected for operation. The air circulating means is operated intermittently in response to variations in space temperature and of the heat exchange medium when heating means is selected for operation and continuously when the cooling means is selected for operation.

Other objects of my invention will become apparent from the ensuing description taken in conjunction with the accompanying drawing in which is set forth for the purpose of illustration the details of arrangement.

The single figure of the drawing shows diagrammatically air conditioning apparatus designed for year around operation and illustrates schematically a control system therefor embodying the features of the present invention.

Referring to the figure, reference numeral 10 designates a space such as a room, building or the like, to which the conditioning medium, preferably air, is to be supplied. The air is supplied to the space by an air conditioner 11 preferably located without said space and provided with the usual recirculated air duct 12, a fresh air duct 13 and a discharge duct 14. The proportions of fresh and recirculated air may be controlled by dampers 15 and 16 in the recirculated and fresh air ducts, respectively. These may be controlled either manually or automatically in response to indoor or outdoor temperature conditions. The conditioner is also provided with a fan 18 positioned in the discharge duct and driven by an electric motor 19, controlled in a manner hereinafter to be described, for circulating the air through the space. The air drawn through the conditioner may be conditioned by suitable heating, cooling and humidifying means forming part of the conditioner.

The cooling means consists of the usual mechanical refrigerating apparatus comprising an evaporator, compressor, condenser, liquid receiver and expansion valve. The evaporator 20 is connected by a conduit 21 to the suction side of a compressor 22. The high pressure side of the compressor is connected by conduit 23 to a condenser 24 which may be cooled in any suitable manner. The condenser in turn is connected to a liquid receiver 25 and the latter is connected through conduit 26 to a thermostatically controlled expansion valve 27 controlling the refrigerant flow to the evaporator. The compressor itself is driven by a suitable prime mover such as an electric motor 29, also controlled in response to temperature variations in the enclosure in a manner hereinafter to be described.

To properly humidify the air supplied to the space during seasons when heating is required, I have provided a humidifying apparatus 30. This is illustrated as being of the wire screen type but may be of any other desirable construction. Water is supplied to the humidifier through a conduit 31 under the control of a valve 32 having a spring biased operating arm 33 and adapted to be moved from closed to open position, and vice versa, by any suitable operating means such as the electrical solenoid 34 illustrated in the drawing.

The heating means within the conditioner is diagrammatically illustrated as a coil 35 adapted to be supplied with a suitable heating medium such as steam or hot water through conduits 36 leading to a furnace 37 of any well known type. The latter is adapted to increase the supply of heat available to the heating coil 35 upon the energization of suitable electrical control means 38 and likewise to decrease the supply of heat upon the deenergization thereof. The energization of the control means is also under the control of thermal responsive means located within the space being conditioned as will be described more in detail later.

My invention is not directed to any particular type of temperature changing or humidifying means. It is obvious to those skilled in the art that instead of using heating and cooling means of the types illustrated, I may equally well use hot and cold water and control the supply thereof to the heat exchanger units in the conditioner by suitable electrically operated valves in the supply conduits.

The control, which will be described in greater detail later, is such that when the temperature within the enclosure 10 falls below a value at which it is desirable to place the heating means into operation, the latter will be placed under the control of thermal responsive means 41 positioned in the enclosure. As brought out generally heretofore, the air circulating means is not only under the control of the thermal responsive means 41 but is also under the control of a second thermal responsive means 42, called a heat exchanger thermostat, positioned adjacent to or in the near vicinity of the heating means 35. According to this arrangement the circulating means is operated only upon a call for heat and when the temperature of the air flowing past the second thermal responsive means is above a predetermined value. The cooling means is under the control of a third thermal responsive means 43 also positioned within the enclosure 10. When cooling is called for by the last mentioned thermal responsive means the air circulating means is placed into operation simultaneously with the cooling means.

The control of the humidifying means within the conditioner is similar to that disclosed and claimed in my application for Letters Patent, Serial No. 83,921, referred to previously. Briefly, the control is such that the humidifying means may be placed into operation only during those periods when the heating means is in operation and the fan has also been placed in operation. When these conditions obtain the supply of water to the humidifier will be under the control of a humidostat 44 positioned either within the enclosure or in the return duct from the enclosure and responsive to humidity variations therein.

The detailed description of the various electrical circuits whereby the control outlined briefly above functions will now be given. The various controls and the electrical apparatus of the system are provided with electrical energy from a pair of supply conductors 45 which may be connected to a suitable source of energy by means of a manually operable switch 46. The thermal responsive means 41 and 43, which will hereinafter be referred to as the heating thermostat and cooling thermostat, respectively, are provided with low voltage energy through transformers 47 and 48, respectively. The secondary winding of transformer 47 is connected by means of conductors 49 and 50 to a pair of adjustably mounted contacts 51 and 52 associated with the thermal responsive element 53 of the heating thermostat 41. Thermal responsive element 53, which is illustrated as being of the bimetallic type, is connected by means of a conductor 54 to relay 55 and a normally open switch 56 controlled by said relay. Switch 56 controls a holding circuit for relay 55 extending from conductor 54 to a conductor 57 connected to the secondary winding of the transformer. Relay 55 is also adapted to actuate a second switch 58 operable from engagement with a first contact 59 into engagement with a second contact 60. Switch member 58 is connected to the source of energy by a conductor 61. When the switch is in engagement with contact 59 an energizing circuit is conditioned for closure by the cooling thermostat 43, as will be explained more fully hereinafter, and when the switch member is actuated into engagement with contact 60 a circuit including conductor 61, an electrical control device such as relay 62, and one of conductors 63 through which power is supplied to the electrical control means 38 of the furnace is closed. Relay 62 is adapted to actuate a pair of switches 64 and 65, the former connecting the electrical control means 38 of furnace 37 to the source of supply and the latter conditioning a humidifier control circuit for energization by the humidostat 44. The detailed arrangement of the humidifier control circuit will be described more fully after the description of the cooling control is given.

The cooling thermostat 43 controlling the operation of the cooling apparatus is connected to the source of supply through the secondary winding of transformer 48 in a manner identical with that of the heating thermostat 41. Conductors 67 and 68 lead from the terminals of the secondary winding of the transformer to adjustably mounted contacts 69 and 70 associated with the thermal responsive element 71 of the thermostat. The latter is connected by a conductor 72 to a relay 73 and to a switch 74 adapted when actuated to its closed position upon energization of relay 73 to close a holding circuit for the relay. Relay 73 is also adapted to actuate a second switch 75 into and out of engagement with a contact 76. When the switch is in engagement with the contact a circuit is closed through the previously mentioned conductor 61, a conductor 77, a second electrical control device such as relay 78, to one of conductors 79 completing a circuit to the source of power. Relay 78 is adapted to effect upward movement of a pair of normally open switches 80 and 81 associated therewith. One of the contacts associated with the last mentioned switch is connected by a conductor 82 to the contact 59 of switch 58. The other contact of the switch is connected by a conductor 83 to a conductor 84 leading to the cold contact 85 of a pair of adjustably mounted contacts 85 and 86 cooperatively associated with thermal responsive elements 87 of the heat exchanger thermostat 42. Element 87 in turn is connected by a conductor 88 to a conductor 89, one branch of which leads to the solenoid valve 34 and the second branch to a third electrical control device, such as the relay 90 from which conductor 91 leads to one of the conductors 79 leading to the source of power. Thus, whenever switch 58 is in the position indicated, as it will be whenever the heating thermostat 41 is satisfied, and switch 75 is in the position indicated, as it will be whenever the cooling thermostat 43 calls for cooling, the relay 90 will be energized through a circuit including the heat exchanger thermostat in its cold position. The relay is adapted to effect upward movement of a pair of normally open switches 92 and 93, associated therewith. Switch 93 is adapted to connect the fan motor 19 to the source of power through conductors 79. Switch 92 is adapted to close a circuit including conductor 94, the previously mentioned switch 80 and a conductor 95 to energize an electrical control device such as relay 96 connected to one of a pair of conductors 97 through which power is supplied to the compressor motor 29 whenever switch 98 is actuated in response to energization of the relay.

The fan may be operated alone in summer time merely by closing switch 90A controlling the energization of relay 90 through a circuit including the heat exchanger thermostat in its cold position.

The humidifier control circuit extends from the source of supply through conductor 99 to the humidostat 44, and thence through conductor 100 to the normally open switch 65 associated with relay 62, and conductor 101 to the solenoid winding 34 controlling the actuation of valve 32. According to this arrangement the humidifier can be operated only when the heating means is in operation, the humidity within the space is below the value at which the humidostat is set to operate and the fan is in operation. The last-mentioned prerequisite is fulfilled on a call for heating when the thermostatic element 87 of the heat exchanger thermostat moves from engagement with its cold contact 85 into engagement with its hot contact 86, thereby closing a circuit through conductors 88, 102, and 66, switch member 58 in engagement with contact 60, and conductor 61 to the source of power.

The operation of the system as a whole will be more apparent from the ensuing description. For the purpose of description it will be assumed first that the heating thermostat 41 is adapted to maintain the enclosure at a temperature of seventy degrees, and that the cooling thermostat 43 is adapted to maintain the enclosure at a temperature of eighty degrees. These assumptions are not exactly correct because of the fact that a certain differential of temperature is required to operate the thermal elements of the respective thermostat into and out of engagement with their respective normally stationary contacts. However, this differential may be varied between certain limits which are not in excess of one or two degrees at most and therefore, as far as this description is concerned, the temperature values indicated may very well be assumed. More particularly, it will be assumed that thermal element 53 is in engagement with contact 51 at all temperatures below seventy degrees and in engagement with contact 52 at all temperatures above this value. Likewise, it will be assumed that thermal element 71 is in engagement with contact 69 at all temperatures below 80 degrees and in engagement with contact 70 at all temperatures above this value. It will be assumed also that thermal responsive element 87 of the heat exchanger thermostat 42 will move out of engagement with cold contact 85 and into engagement with hot contact 86 at some predetermined value, such as one hundred and twenty degrees. These temperatures are to be considered merely as illustrative and in no way to limit the scope of my invention.

Considering first the operation of the system when the temperature within the enclosure is below a value of seventy degrees, then it will be seen that the relay 73 associated with the cooling thermostat is energized because element 71 is in engagement with contact 69. The energizing circuit for this relay extends from the secondary winding of the transformer through conductor 67, contact 69, element 71 in engagement therewith, and conductor 72 to the relay winding and thence to the other side of the transformer winding. Energization of the relay effects upward movement of switches 74 and 75, switch 74 closing a holding circuit for the relay and switch 75 being moved out of engagement with contact 76 to de-energize relay 78.

When the temperature within the enclosure is below seventy degrees, relay 55 associated with the heating thermostat 41 is also energized. The energizing circuit extends from the secondary winding of the transformer through conductor 49, contact 51, thermal responsive element 53 in engagement therewith, and conductor 54 to the relay winding and thence to the other terminal of the transformer winding. Energization of the relay effects upward movement of its associated switches 56 and 58, the former closing a holding circuit for the relay and the latter energizing control device 62 controlling the operation of the heat increasing means.

The energizing circuit for relay 62 extends from the source of power through conductor 61, switch 58 in engagement with contact 60, conductor 66, to the relay winding and thence through one of conductors 63 to the other conductor of the source of energy. Energization of the relay 62 effects upward movement of switch 64 and resultant energization of the furnace controlling means 38. Initiation of operation of the furnace results in the transfer of heat therefrom to the heat exchange coil 35 within the conditioner. Thus far the fan has not been placed in operation but after the temperature surrounding the heat exchanger thermostat rises to a value above one hundred and twenty degrees, the fan will be rendered operative when thermal element 87 engages its associated hot contact 86 and closes an energizing circuit for the fan control relay 90. This circuit extends from the source of power through conductor 61, switch 58 in engagement with contact 60, conductor 66, conductor 102, contact 86, element 87 in engagement therewith, conductors 88 and 89 to the relay winding and thence through conductor 91 and one of the pair of conductors 79 back to the source of power. Energization of the relay effects upward movement of switches 92 and 93. Operation of the first mentioned switch has no effect on the system because of the fact that switch 80 is in its open position. However, operation of switch 93 results in the energization of fan motor 19 through conductors 79 and circulation of air through the enclosure by fan 18. Thus, on a call for heat by the heating thermostat 41, the heating means is set into operation and thereafter when the temperature of the air adjacent the heat exchanger thermostat reaches a predetermined value the air circulating means is placed into operation.

Humidification is desirable particularly during the heating season and provision is made in the instant control system for such operation. Energization of the heating control relay 62 not only effects operation of the heating apparatus but also conditions the humidifier control circuit through closure of switch 65 and the resultant operation of the heat exchanger thermostat into engagement with its hot contact 86. Thereafter, whenever the humidity within enclosure 10 falls below a predetermined minimum value, the humidostat 44 energizes solenoid 34 controlling the flow of water to the humidifier through a circuit extending from the source 45 through conductor 99, humidostat 44, conductor 100, switch 65 in its closed position, conductor 101, to the solenoid winding, and thence through conductor 88, thermal responsive element 87 in engagement with contact 86, conductors 102 and 66, contact 60 and switch arm 58 in engagement therewith, and conductor 61 back to the source. The humidifying function is terminated whenever the humidity again rises above the value for which the humidostat is calibrated and also whenever the temperature requirements within the enclosure 10 have been met.

When the temperature within the enclosure rises above seventy degrees the thermal responsive element 53 will engage contact 52 and thereby short circuit relay 55 in an obvious manner. Switches 56 and 58 are thereby moved downwardly the former opening a previously described holding circuit and the latter engaging contact 59. Operation of the heating means as well as of the humidifying means, if the latter was in operation at this time, is terminated by the opening of the circuit between switch member 58 and contact 60. Engagement of contact 59 by the switch 58 does not effect any operation at this time because of the fact that relay 78 is de-energized and switch 81 consequently open. If the temperature within the enclosure 10 again falls below seventy degrees the above described operation will be repeated.

If the temperature conditions without the enclosure moderate and the temperature gradually increases above seventy degrees the heating and cooling apparatus will both remain out of operation until the temperature within the enclosure rises to a value above eighty degrees. When the temperature attains this value thermal responsive element 71 of the cooling thermostat will engage contact 70 and thereby short circuit relay 73 and de-energize it. This de-energization results in the downward movement of switch arms 74 and 75, the former opening the holding circuit for the relay 73 and the latter effecting energization of relay 78. The latter in turn effects, through operation of switches 80 and 81, the energization of the fan control relay 90 and the cooling control relay 96. The energizing circuit for relay 78 extends from the source of power through conductor 61, switch 75 in engagement with contact 76, conductor 77 to the relay winding and from thence through one of conductors 79 to the source of power. Switches 80 and 81 are moved upwardly to close their respective circuits, the former conditioning a circuit leading from conductor 94 through conductor 95 to the cooling control relay 96 whereby the latter will be energized upon energization of relay 90 and the resulting closure thereby of switch 92. Switch 81 energizes fan control relay 90 through a circuit extending from the source of power to conductor 61, switch 58 in engagement with contact 59, conductor 82, switch 81 in its closed position, conductors 83, and 84, contact 85 and element 87 in engagement therewith, and conductors 88 and 89 to the relay and thence through conductor 81 and one of conductors 79 back to the source.

It should be noted that the above described energizing circuit extends through element 87 in engagement with its cold contacts. After termination of operation of the heating means the heat exchanger thermostat returns to its cold position very shortly thereafter because of the fact that it returns to engagement with the cold contact 85 whenever the temperature of the air decreases below one hundred and twenty degrees. Energization of the fan control relay effects upward movement of switches 92 and 93, the latter connecting motor 19 to the source of power and the former completing the energizing circuit for the cooling control relay 96. The complete energizing circuit for relay 96 extends from the source of power through conductor 61, switch 58 in engagement with contact 59, conductor 82, switch 81, conductor 83, switch 92 in its closed position, conductor 94, switch 80 and conductor 95 to the relay winding and thence through one of conductors 97 back to the source.

Energization of the cooling control relay effects upward movement of switch 98 and the latter thereupon connects compressor motor 29 to the source of energy through conductors 97. Motor 29 operates the compressor 22 of the cooling apparatus and the refrigerant flowing through evaporator 20 cools the air flowing thereby. After a length of time determined by outdoor temperature conditions, the temperature within the enclosure decreases below eighty degrees. Thereupon thermal responsive element 71 engages contacts 69 and the previously described energizing circuit for relay 73 is closed. Switches 74 and 75 are moved upwardly, the former closing a holding circuit for the relay and the latter de-energizing relay 78. De-energization of the last mentioned relay terminates operation of both the cooling apparatus and fan by opening switches 80 and 81.

As long as the room thermostats are adjusted to operate in the assumed ranges, the two will cooperate in the manner described to control the heating and cooling appartus. If the thermostats were entirely independent of each other in accordance with past practice and the two were accidentally adjusted to operate within the same temperature range, then both the heating and cooling apparatus would be operated simultaneously, with obvious deleterious effects. Such operation is not possible with the above described control because of the fact that the cooling thermostat can take control only when the heating thermostat is in its "off" position, i. e., when switch 58 is in engagement with contact 59. From the above described operation it will be seen that the fan and cooling control relays 90 and 96 cannot possibly be energized unless switch 58 is in engagement with contact 59. Thus, if the two thermostats were adjusted to operate within the same range the cooling thermostat could not exert its control function unless the temperature within the enclosure 10 was above the value at which the heating thermostat calls for heat.

It should be noted also that the fan is operated intermittently during both heating and cooling. During heating the fan is placed into operation upon a call for heat by the heating thermostat and when the heat exchanger thermostat has been actuated to its hot position, and immediately upon a call for cooling by the cooling thermostat. According to this arrangement circulation of air is obtained immediately upon a call for cooling and this has the advantage that the circulation alone will impart a certain cooling effect to persons within the enclosure. By use of the heat exchanger thermostat during the heating operation I prevent the discharge of cold air into the room upon a call for heat.

What I claim as new and desire to secure by Letters Patent of the United States is:

1. In an air conditioning system, the combination including heating means and cooling means for an enclosure, thermal responsive means responsive to the temperature of said heating means, means controlling said heating means including a thermal responsive device responsive to the temperature of said enclosure and adjustable to operate at a selected temperature, means controlling said cooling means including a thermal responsive device responsive to the temperature of said enclosure and adjustable to operate at a second selected temperature normally different from said first mentioned temperature of said enclosure, and means controlled jointly by said first and second mentioned thermal responsive devices for rendering said last mentioned thermal responsive device ineffective to control said cooling means when the two adjustable thermal responsive devices are adjusted to operate at the same temperature.

2. In an air conditioning system, the combination including heating means and cooling means for an enclosure, means controlling said heating means including a thermostat adjustable to operate at a selected temperature, means controlling said cooling means including a thermostat adjustable to operate at a second selected temperature normally different from said first mentioned temperature, and means including a thermostat responsive to the temperature of said heating means for rendering said last mentioned control means effective to control said cooling means only when said first mentioned control means has reduced the temperature of said heating means below a predetermined value.

3. In an air conditioning system, the combination including, air circulating means, air heating means and air cooling means for an enclosure, means including an adjustable thermostat responsive to the temperature of the enclosure and controlling said heating means for maintaining the temperature within said enclosure within predetermined limits, means including an adjustable thermostat responsive to the temperature of the enclosure and controlling said cooling means for maintaining the temperature within said enclosure within predetermined limits and normally adjusted to operate without said first mentioned limits, a thermostat responsive to the temperature of said heating means and interconnected with said heating control means for operating said air circulating means when the temperature of the air heating means is above a predetermined value and interconnected with said cooling control means for operating said air circulating means when the temperature of said heating means is below said value and means including said last mentioned thermostat for rendering said heating control means solely effective when both said adjustable thermostats are adjusted to exert predetermined control functions within the same limits.

4. In an air conditioning system the combination including means for circulating air to an enclosure means for heating the circulated air, means for cooling said enclosure, means for controlling said heating means and including a thermostat adjustable to maintain the temperature within said enclosure within predetermined limits, means controlling said cooling means and including a separate thermostat adjustable to maintain the temperature within said enclosure within predetermined limits, a thermostat responsive to the temperature of said air heating means and interconnected with said heating control means for operating said air circulating means when the temperature of said air heating means is above a predetermined value and interconnected with said cooling control means for operating said air circulating means when the temperature of said heating means is below said value and means controlled by said heating thermostat for preventing said cooling thermostat from rendering said cooling means effective when both said thermostats are adjusted to exert control within the same limits.

5. In a temperature regulating system, the combination including heating means, cooling means, electrical control means for each, means including a source of energy and thermal responsive means having a two position relay controlled thereby and adapted in one position thereof to connect the heating control means to said source of energy for controlling the operation of said heating means, a thermostatic switch responsive to the temperature of said heating means and having an energizing circuit for said cooling control means adapted to be connected to said source of energy by said relay in the other position thereof, second thermal responsive means, and relay means controlled thereby adapted selectively to complete said energizing circuit for controlling the operation of said cooling means.

6. In a conditioning system for an enclosed space, means for circulating a conditioning medium through said space, means for heating said medium, means for cooling said medium, thermal responsive means in said space and having electroresponsive switch mechanism controlled thereby for controlling said cooling means to maintain the space temperature within predetermined limits, second thermal responsive means in said space having electroresponsive switch mechanism controlled thereby for controlling said heating means to maintain the space temperature within other predetermined limits, third thermal responsive means located adjacent said heating means having electroresponsive switch mechanism controlled thereby and interconnected with the electroresponsive switch mechanism controlled by said first and second thermal responsive means for controlling the operation of said circulating means, and interlocking circuit connections between said electroresponsive switch mechanisms whereby said first mentioned thermal responsive means is prevented from controlling electroresponsive switch mechanism for the cooling means when the second mentioned thermal responsive means controls the corresponding electroresponsive switch mechanism to effect operation of said heating means.

7. In a conditioning system for an enclosed space, means for circulating a conditioning medium through said space, means for heating said medium, means for cooling said medium, thermal responsive means in said space having a relay for controlling said cooling means to maintain said space temperature within predetermined limits, second thermal responsive means in the space having a relay for controlling said heating means to maintain said space temperature within other predetermined limits, third thermal responsive means located adjacent the heating means and having a relay for controlling operation of said circulating means, and interlocking connections between said relays whereby the circulating means is controlled jointly by the second and third mentioned relays when the heating means is placed into operation and jointly by the first, second and third mentioned relays when the cooling means is placed in operation.

8. In a conditioning system for an enclosed space, the combination including means for circulating a conditioning medium through said space, means for heating said medium, means for cooling said medium, electrical control means adapted when energized to render said heating means operative, second electrical control means adapted when energized to render said cooling means operative, third electrical control means adapted when energized to render said circulating means operative, a source of electrical energy, an energizing circuit for said first mentioned control means, and thermal responsive means in said space having a relay for connecting said energizing circuit to said source, an energizing circuit for said third control means including said relay and a second thermal responsive means adjacent said heating means and having a relay so connected that the circulating means is rendered operative only upon a call for heat by said first mentioned thermal responsive means and when the temperature of the medium is above a predetermined value, and an energizing circuit for said second control means including said first and second mentioned relays, and a third thermal responsive means in the space having a relay so connected with said first and second mentioned relays that the third mentioned relay is effective to energize said second electrical control means to render the cooling means operative only when operation of said heating means is stopped by the first mentioned thermal responsive means.

9. In a conditioning system for an enclosed space, the combination including means for circulating a conditioning medium through said space, means for heating said medium, means for cooling said medium, electrical control means adapted when energized to render said heating means operative, second electrical control means adapted when energized to render said cooling means operative, third electrical control means adapted when energized to render said circulating means operative, a source of electrical energy, an energizing circuit for said first mentioned control means, and thermal responsive means in said space having a relay for connecting said energizing circuit to said source, an energizing circuit for said third control means including said relay and a second thermal responsive means adjacent said heating means so connected that the circulating means is rendered operative only upon a call for heat by said first mentioned thermal responsive means and when the temperature of the medium is above a predetermined value, and an energizing circuit for said second control means including said relay, a third thermal responsive means positioned in said space, and a pair of relays actuatable thereby, all so connected that the latter are effective when actuated to energize said circuit to render said cooling means operative only when the first mentioned thermal responsive means is satisfied, one of said relays also effecting energization of the third control means to place the circulating means in operation.

10. In a room temperature regulating system, the combination including a heat transfer medium circulating means, heating means, cooling means, an electrical control device for each adapted when energized to render the corresponding means effective, a first and second thermal responsive means, each responsive to a different room temperature, a third thermal responsive means operable in response to a temperature condition of the heat transfer medium, and interlocking relay connections whereby the first thermal responsive means separately controls the energization of the electrical control device for the heating means and jointly with the second thermal responsive means controls the energization of the electrical control device for the circulating means when the heating means is in operation and jointly with the second and third thermal responsive means controls the energization of the electrical control device for the cooling means and the circulating means when the operation of the heating means is stopped.

11. In an air conditioning system for an enclosure, the combination including means for circulating air to the enclosure, means for heating the air, means for cooling the air, electrical control means for each, a pair of adjustable thermostats responsive to the air temperature within the enclosure and normally adjusted to operate at different temperature values, a separate thermostat responsive to the temperature of the air adjacent said air heating means, and interlocking relay connections between said thermostats whereby one of said pair of thermostats separately controls the energization of the electrical control means for the heating means and jointly with said separate thermostat controls the energization of the electrical control means for said circulating means when the heating means is in operation and jointly with said separate thermostat and the other of said pair of thermostats controls the energization of the electrical control means for the cooling means and the circulating means when the operation of the heating means is stopped.

12. In a temperature regulating system, the combination including a heat transfer medium circulating means, heating means for said medium, cooling means for said medium, electrical operating means for each, means including a pair of thermal responsive means responsive to different temperatures of the heat transfer medium, and electrical circuit connections controlled separately by one of said thermal responsive means for selectively energizing and deenergizing the heating means, cooperating circuit connections controlled jointly by said pair of thermal responsive means for selectively energizing and deenergizing the heating medium circulating means, and means including a third thermal responsive means responsive to the temperature of said heating means, and circuit connections jointly controlled by said pair of thermal responsive means for rendering said third thermal responsive means effective to selectively energize the cooling and circulating means only when the heating means is deenergized.

13. In a temperature regulating system, the combination including a heat transfer medium circulating means, heating means for said medium, cooling means for said medium, control means therefor including a pair of thermal responsive means, one for separately controlling the operation of said heating means and jointly with the other controlling the operation of said circulating means, and means including a third thermal responsive means responsive to the temperature of said heating means and having interlocking connections with said pair of thermal responsive means for controlling said cooling means and said circulating means only when the operation of said heating means is stopped.

HARRY R. CRAGO.